T. F. PERKINS.
GRAIN TOLLER.
APPLICATION FILED NOV. 1, 1919.
1,394,761.
Patented Oct. 25, 1921.
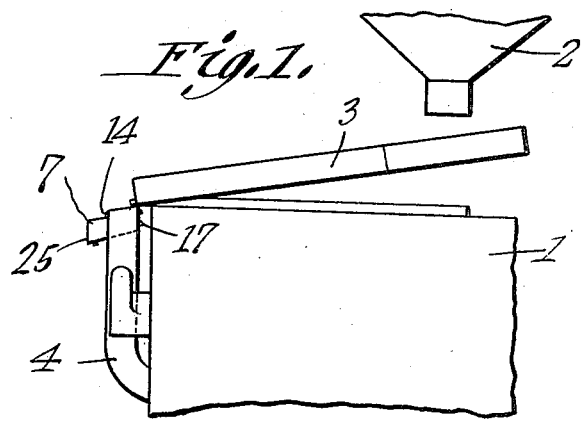
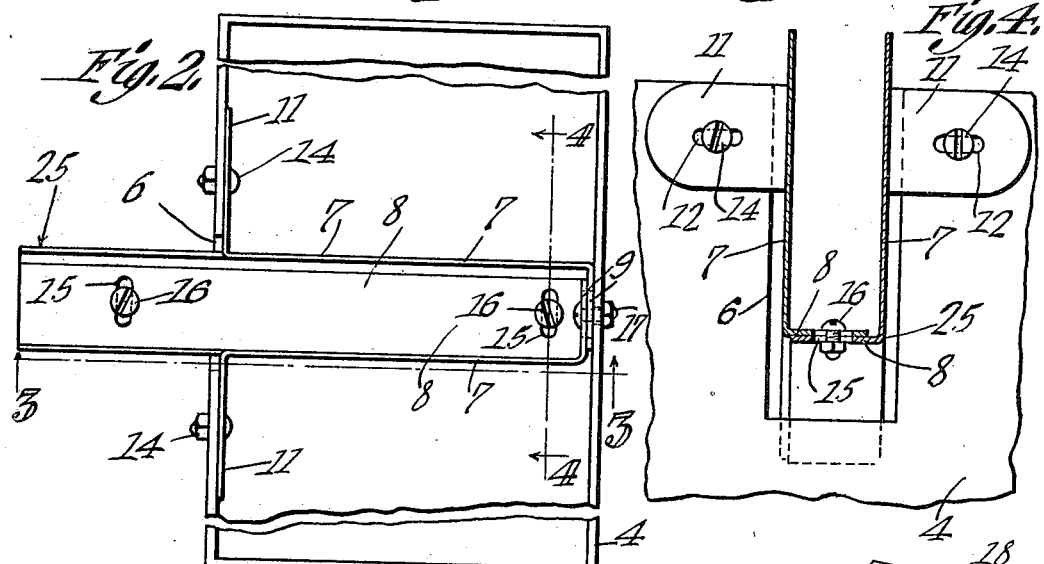
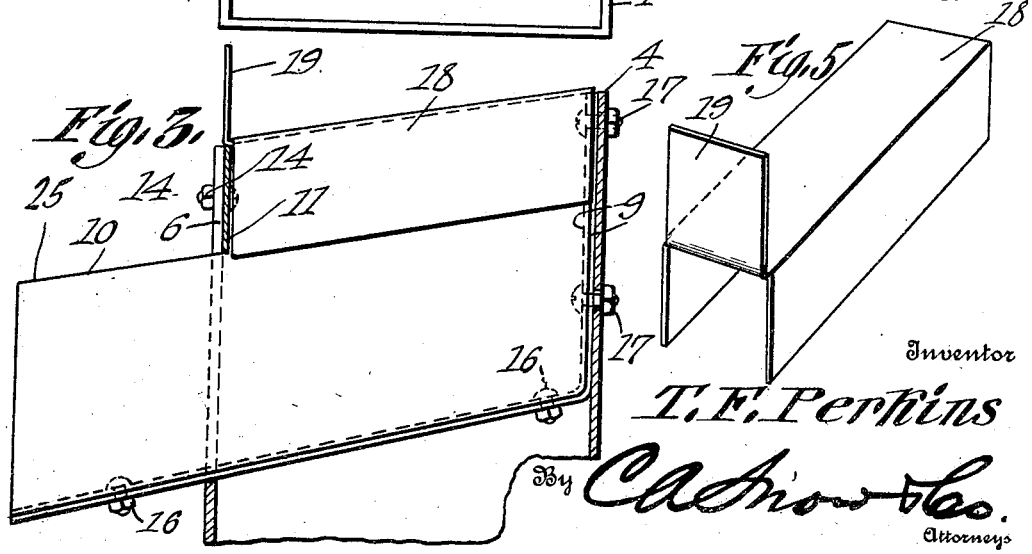
Inventor
T. F. Perkins
By Cashow & Co.
Attorneys

UNITED STATES PATENT OFFICE.

THOMAS F. PERKINS, OF ATLANTA, TEXAS.

GRAIN-TOLLER.

1,394,761.  Specification of Letters Patent.  Patented Oct. 25, 1921.

Application filed November 1, 1919. Serial No. 335,055.

*To all whom it may concern:*

Be it known that I, THOMAS F. PERKINS, a citizen of the United States, residing at Atlanta, in the county of Cass and State of Texas, have invented a new and useful Grain-Toller, of which the following is a specification.

It is the object of this invention to provide a simple device which, being placed in the chute of a grinding mill, will withdraw automatically, the miller's toll, the device being adjustable to regulate the amount of toll taken.

Within the scope of what is claimed, a mechanic may make changes in the structure shown, without departing in a corresponding degree from the spirit of the invention.

In the drawings:—Figure 1 is a diagram, in the nature of an elevation, showing a grinding machine whereunto my toller has been applied; Fig. 2 is a top plan of the main chute of the grinding machine, the toll chute being mounted in place; Fig. 3 is a vertical section on the line 3—3 of Fig. 2; Fig. 4 is a section on the line 4—4 of Fig. 2; and Fig. 5 is a perspective showing the barrier for the toll chute.

The numeral 1 designates the body of a grinding mill. The hopper is shown at 2 and discharges into a shaker 3 which pours the corn or other grain into a vertical main chute 4, the chute 4 delivering the corn into the body 1 to the burs or other means (not shown) whereby the corn is ground. A blast fan, forming no part of this invention, may communicate with the chute 4.

In carrying out the invention, an opening 6 is fashioned in the outer wall of the main chute 4, this opening serving to receive a trough-like toll chute 25. The toll chute 25 is a two-part structure, each part of the toll chute embodying a side 7, a bottom 8 and an end 9, the bottoms being overlapped, and the same observation holding true with respect to the ends 9. At their outer ends, the sides 7 are cut along longitudinal lines and the material thus freed is bent at right angles to form wings 11, the lines along which the walls are cut being designated by the numeral 10. There are elongated slots 12 in the wings 11 and securing devices 14, mounted in the slots, connecting the wings 11 with the front wall of the chute 4, the toll chute 25 extending practically across the main chute from front to back, as is evident from Fig. 2. In the overlapped bottoms 8 of the toll chute parts, the elongated slots 15 are fashioned, the same receiving securing devices 16. Elongated slots are formed in the ends 9, the same receiving securing devices 17 which engage the rear wall of the main chute 4.

The toll chute 25 may be adjusted in width to vary the amount of toll taken, the securing devices 16 (bolts) being tightened to hold the toll chute at adjusted width. Obviously, the wider the chute, the more toll will be extracted. The securing devices 14 and 17 are then mounted in place, to hold the toll chute 25 on the main chute 4. The opening 6 in the front wall of the main chute 4 is wide enough to permit a transverse adjustment of the toll chute 25. The grain proceeds into the main chute 4 from the shaker 3, and as the grain drops in the main chute, the toll chute 25 will receive a modicum of the falling grain and deliver the same as toll, externally of the main chute 4.

Should it be desired to take no toll, then a trough-shaped barrier 18 is inverted on that part of the toll chute 25 which is located in the main chute 4, the barrier being provided at its forward end with an upstanding baffle 19, the function of which is to prevent the grain which falls on the barrier 18 from flying out of the main chute 4.

I claim:—

1. In a device of the class described, a main chute having front and rear walls and provided with an opening in the front wall; a toll chute located in the opening and extended across the main chute, the toll chute comprising members having sides, overlapped bottoms and overlapped ends, the sides being provided with outstanding wings; means for securing the wings adjustably to the front wall of the main chute and means for securing the ends adjustably to the rear wall to permit a change in the width of the chute.

2. In a device of the class described, a main chute having a front wall provided with an opening; a toll chute located in the opening and extended across the main chute, the toll chute comprising members having sides, overlapped bottoms and overlapped ends; the sides being provided with outstanding wings; and means for securing the wings adjustably to the front wall to permit a change in the width of the chute.

3. In a device of the class described, a main chute having a front and rear wall, the front wall being provided with an opening; a toll chute located in the opening and extended across the main chute, the toll chute comprising members having sides, overlapped bottoms and overlapped ends; and means for securing the ends to the rear wall adjustably, to permit a change in the width of the chute.

In testimony that I claim the foregoing as my own, I have hereto affixed my signature in the presence of two witnesses.

THOMAS F. PERKINS.

Witnesses:
  MASON B. LAWTON,
  IVY E. SIMPSON.